United States Patent Office 3,342,792
Patented Sept. 19, 1967

3,342,792
PREPARATION OF ELASTOMERS
Walter G. Toekelt, Downers Grove, Ill., assignor to Universal Oil Products Company, Des Plaines, Ill., a corporation of Delaware
No Drawing. Filed Dec. 11, 1964, Ser. No. 417,808
13 Claims. (Cl. 260—93.1)

This invention relates to a process for the preparation of rubber-like materials and more specifically to a process for the preparation of foam-like elastomeric compositions.

In modern day technology many more uses for synthetic materials are being thought of everyday. Therefore, it is necessary that new and useful synthetic materials in which possess identical properties to naturally occurring materials must be found. The uses of synthetic rubber-like material and plastic or resin materials has increased in the past few years to a point where the synthetic prepared compounds are used to a much greater extent than are the natural materials.

In view of this, elastomeric compositions which possess the properties of natural, reclaimed, vulcanized, or synthetic rubbers are necessary. The present invention is concerned with a process for preparing a foam-like elastomeric composition which is thermo-plastic in nature and which may be combined with other plastic or resinous materials to prepare articles of commerce which find a great variety of uses in the present world. By combining this elastomer with other plastics or resins, the finished product will possess many desirable characteristics among which are high tensile strength and elongation, good resilience and abrasion resistance, good electrical properties, resistance to oxidation, etc. In addition, it is also contemplated that the elastomeric composition may be admixed with a high-boiling solvent or plasticizer to prepare finished compositions of matter which themselves possess many desirable physical properties.

It is, therefore, an object of this invention to provide a process for the preparation of an elastomeric composition.

A further object of this invention is to prepare an elastomeric composition by the combined oxidation-nitration of a cycloalkene.

In one aspect an embodiment of this invention resides in a process for the preparation of an elastomeric composition which comprises subjecting a cycloalkene to a combined oxidation-nitration treatment with nitric acid at an elevated temperature, separating the resultant product, treating said product with an alkaline susbtance, reacidifying the resultant solution, and recovering the desired elastomeric composition.

A further embodiment of this invention is found in a process for the preparation of an elastomeric composition which comprises subjecting a cycloalkene to a combined oxidation-nitration treatment with nitric acid in the presence of a catalyst containing a metal selected from the group consisting of cobalt, manganese and vanadium at an elevated temperature, separating the resultant product, treating said product with an alkaline substance, reacidifying the resultant solution, and recovering the desired elastomeric composition.

A specific embodiment of this invention is found in a process for the preparation of an elastomeric composition which comprises subjecting a cycloalkene to a combined oxidation-nitration treatment with nitric acid in the presence of ammonium vanadate at a temperature in the range of from about 50° to about 150° C., separating the resultant product, treating said product with an alkaline substance, reacidifying the resultant solution, and recovering the desired elastomeric composition.

Another specific embodiment of this invention resides in a process for the preparation of an elastomeric composition which comprises subjecting cyclododecene to a combined oxidation-nitration treatment with nitric acid at a temperature in the range of from about 50° to about 150° C., separating the resultant product, treating said product with sodium hydroxide, reacidifying the resultant solution with hydrochloric acid, and recovering the desired elastomeric composition.

Other objects and embodiments will be found in the following further detailed description of this invention.

As hereinbefore set forth, it is now been found that foam-like elastomeric compositions may be prepared by treating a cycloalkene to a combined oxidation-nitration treatment at an elevated temperature. The process may be effected, if so desired, in the presence of a catalyst containing a material such as cobalt, manganese, or vanadium. The reaction is preferably effected as hereinbefore set forth, at elevated temperatures ranging from about 50° up to about 150° C.

The cycloalkenes which are utilized as starting materials in the process of this invention comprises cycloalkenic hydrocarbons containing only carbon and hydrogen atoms and preferably containing at least 10 carbon atoms in the ring. Examples of these hydrocarbons include cyclodecene, cycloundecene, cyclododecene, cyclotridecene, cyclotetradecene, cyclopentadecene, etc.

The process of the present invention may be effected in any suitable manner and may comprise either a batch or continuous type operation. For example, when a batch type operation is used, a quantity of the cycloalkene is placed in an appropriate apparatus along with a combined oxidation-nitration agent. In the present embodiment of the invention this agent comprises concentrated nitric acid and water in a 1:1 ratio. It is also contemplated that other oxidizing agents such as potassium permanganate, etc., may also be utilized, although not necessarily with the equivalent results. The resulting solution is stirred while being heated to the desired reaction temperature and maintained thereat for a predetermined residence time, said residence time ranging from about 0.5 to about 10 hours or more. If so desired, the reaction may also be effected in the presence of a catalyst containing manganese, cobalt, and vanadium. Examples of said catalyst includes ammonium vanadate, cobalt acetate, manganese acetate, etc. It is to be understood that the aforementioned compounds are only representative of the class of compounds which may be used, and that the present invention is not necessarily limited thereto.

Upon completion of the desired residence time, the resulting solution which comprises an oil layer and an aqueous layer is then treated with an alkaline material such as sodium hydroxide, potassium hydroxide, lithium hydroxide, calcium hydroxide, magnesium hydroxide, etc., the oil layer being soluble therein. Following this, the alkaline solution is then reacidified with an acid, and preferably an inorganic acid such as hydrochloric acid, hydrobromic acid, sulphuric acid, etc., whereupon the elastomeric material will precipitate out to give the desired foam-like elastomer.

It is also contemplated within the scope of this invention, that the process described herein may be effected in a continuous manner, although not necessarily with equivalent results. When such a method of operation is used, the starting material comprising cycloalkene is continuously charged to a reaction zone which is maintained at the proper operating conditions of temperature and pressure. In addition, the combined oxidation-nitration agent such as concentrated nitric acid and, if so desired, water is charged to the reaction zone through separate means. The reaction zone may also contain a catalyst of the type hereinbefore set forth. Upon completion of the residence time, the reactor effluent is continuously withdrawn, the unreacted starting materials are separated from the product and recycled to form a portion of the feed stock, while the remainder is passed to a second zone. In this zone, the oily solution is treated with the alkaline material wherein said oily portion of the solution dissolves. The resulting solution is then withdrawn from the second zone and passed to a third zone wherein said solution is reacidified by the addition of an acid such as hydrochloric acid. The resulting foam-like elastomer is then separated from the aqueous solution and recovered.

The following examples are given to illustrate the process of the present invention, which however, are not intended to limit the generally broad scope of the present invention in strict accordance therewith.

EXAMPLE I

In this example, 38 g. of cyclododecene was slowly added to a mixture of 136 g. of concentrated nitric acid and 54 g. of glacial acetic acid, with constant stirring, said mixture being maintained at a temperature of 65° C. The resulting solution was stirred for an additional hour after addition of the cyclododecene was completed. Following this, the solution was allowed to cool to room temperature and then added to 200 cc. of water. A yellow solution over a yellow oil was formed at this point. Following this, one-half of the volume was flashed off under a water pump vacuum. The remaining mixture was then poured into 200 cc. of hot water after which an aqueous layer and oil layer separated. A portion of the lower layer (the oil portion) was treated with a solution of 10% sodium hydroxide, said oil being partially soluble therein. The sodium hydroxide solution was then reacidified using hydrochloric acid as the acidifying agent, thus forming a yellow, rubbery elastomer which was tacky and foam-like in texture.

EXAMPLE II

A mixture of concentrated nitric acid and water in a 1:1 ratio was heated to reflux and 30 g. of cyclododecene was slowly added thereto. The resulting solution was stirred for an additional hour while maintaining the mixture at reflux temperature. At the end of this time, the mixture was cooled to room temperature, a yellow solution over a yellow oil being formed. The mixture was then treated by flashing off a portion of the volume under a water pump vacuum and the remainder poured into 200 cc. of hot water. The layers again separated after which the oil layer was treated with a 10% sodium hydroxide solution. Following this the sodium hydroxide solution was reacidified with hydrochloric acid and the resulting foam-like rubbery solid was recovered.

EXAMPLE III

In this example 33 g. of cyclododecene was added to a refluxing mixture of 100 g. of concentrated nitric acid and 100 g. of water. The reflux mixture of concentrated nitric acid-water also contained 15 cc. of a cobalt acetate solution, said solution containing 12% cobalt. The resulting mixture was stirred for an additional period of 1 hour, after addition of the cyclododecene was completed. Upon cooling to room temperature, the oil and aqueous layer separated, thereby obtaining 30 cc. of a yellow oil. The oil was dissolved in a solution of 10% sodium hydroxide, after which said solution was reacidified with hydrochloric acid. Upon reacidification, there was obtained a voluminous spongy mass of polymeric material, which was separated and recovered.

EXAMPLE IV

A mixture of 100 g. of concentrated nitric acid and 100 g. of water along with 1 g. of ammonium vanadate was heated to reflux and 38 g. of cyclododecene was slowly added thereto with constant stirring. The mixture was stirred for a period of 1 hour, after addition of the cyclododecene while maintaining the mixture at reflux temperature. At the end of this time, the mixture was allowed to cool to room temperature and treated in a manner similar to that set forth in the above examples. After addition of the 10% sodium hydroxide to the oil layer and reacidification using hydrochloric acid there was obtained a rubbery foam-like solid mass.

EXAMPLE V

In this example, the preparation of the elastomer was carried out in a manner similar to that set forth in Example III above, except that the catalyst comprised 5 cc. of a manganese acetate solution containing 6% manganese instead of the cobalt acetate. After stirring the mixture of 100 g. of concentrated nitric acid, 100 g. of water, 33 g. of cyclododecene and the catalyst at reflux temperature for a period of 1 hour, the solution was cooled, the oil layer which separated out was dissolved in sodium hydroxide and reacidified with hydrochloric acid. The polymer which separated out as a yellow mass was heated on a steam bath, said mass turning brown and becoming tougher in texture.

I claim as my invention:

1. A process for the preparation of an elastomeric composition which comprises subjecting a cycloalkene to a combined oxidation-nitration treatment with nitric acid at an elevated temperature, separating the resultant product, treating said product with an alkaline substance, reacidifying the resultant solution, and recovering the desired elastomeric composition.

2. A process for the preparation of an elastomeric composition which comprises subjecting a cycloalkene to a combined oxidation-nitration treatment with nitric acid in the presence of a catalyst containing a metal selected from the group consisting of cobalt, manganese and vanadium at an elevated temperature, separating the resultant product, treating said product with an alkaline substance, reacidifying the resultant solution, and recovering the desired elastomeric composition.

3. A process for the preparation of an elastomeric composition which comprises subjecting a cycloalkene to a combined oxidaiton-nitration treatment with nitric acid in the presence of a catalyst containing a metal selected from the group consisting of cobalt, manganese and vanadium at a temperature in the range of from about 50° to about 150° C., separating the resultant product, treating said product with an alkaline substance, reacidifying the resultant solution, and recovering the desired elastomeric composition.

4. A process for the preparation of an elastomeric composition which comprises subjecting a cycloalkene to a combined oxidation-nitration treatment with nitric acid in the presence of cobalt acetate at a temperature in the range of from about 50° to about 150° C., separating the resultant product, treating said product with an alkaline substance, reacidifying the resultant solution, and recovering the desired elastomeric composition.

5. A process for the preparation of an elastomeric composition which comprises subjecting a cycloalkene to a combined oxidation-nitration treatment with nitric acid in the presence of manganese acetate at a temperature in the range of from about 50° to about 150° C., separating the resultant product, treating said product with an alkaline substance, reacidifying the resultant solution, and recovering the desired elastomeric composition.

6. A process for the preparation of an elastomeric composition which comprises subjecting a cycloalkene to a combined oxidation-nitration treatment with nitric acid in the presence of ammonium vanadate at a temperature in the range of from about 50° to about 150° C., separating the resultant product, treating said product with an alkaline substance, reacidifying the resultant solution, and recovering the desired elastomeric composition.

7. A process for the preparation of an elastomeric composition which comprises subjecting a cycloalkene to a combined oxidation-nitration treatment with nitric acid in the presence of a catalyst containing a metal selected from the group consisting of cobalt, manganese and vanadium at a temperature in the range of from about 50° to about 150° C., separating the resultant product, treating said product with potassium hydroxide, reacidifying the resultant solution, and recovering the desired elastomeric composition.

8. A process for the preparation of an elastomeric composition which comprises subjecting a cycloalkene to a combined oxidation-nitration treatment with nitric acid in the presence of a catalyst containing a metal selected from the group consisting of cobalt, manganese and vanadium at a temperature in the range of from about 50° to about 150° C., separating the resultant product, treating said product with sodium hydroxide, reacidifying the resultant solution, and recovering the desired elastomeric composition.

9. A process for the preparation of an elastomeric composition which comprises subjecting a cycloalkene to a combined oxidation-nitration treatment with nitric acid in the presence of a catalyst containing a metal selected from the group consisting of cobalt, manganese and vanadium at a temperature in the range of from about 50° to about 150° C., separating the resultant product, treating said product with sodium hydroxide, reacidifying the resultant solution with hydrochloric acid, and recovering the desired elastomeric composition.

10. A process for the preparation of an elastomeric composition which comprises subjecting cyclododecene to a combined oxidation-nitration treatment with nitric acd at a temperature in the range of from about 50° to about 150° C., separating the resultant product, treating said product with sodium hydroxide, reacidifying the resultant solution with hydrochloric acid, and recovering the desired elastomeric composition.

11. A process for the preparation of an elastomeric composition which comprises subjecting cyclododecene to a combined oxidation-nitration treatment with nitric acid in the presence of cobalt acetate at a temperature in the range of from about 50° to about 150° C., separating the resultant product, treating said product with sodium hydroxide, reacidifying the resultant solution with hydrochloric acid, and recovering the desired elastomeric composition.

12. A process for the preparation of an elastomeric composition which comprises subjecting cyclododecene to a combined oxidation-nitration treatment with nitric acid in the presence of ammonium vanadate at a temperature in the range of from about 50° to about 150° C., separating the resultant product, treating said product with sodium hydroxide, reacidifying the resultant solution with hydrochloric acid, and recovering the desired elastomeric composition.

13. A process for the preparation of an elastomeric composition which comprises subjecting cyclododecene to a combined oxidation-nitration treatment with nitric acid in the presence of manganese acetate at a temperature in the range of from about 50° to about 150° C., separating the resultant product, treating said product with sodium hydroxide, reacidifying the resultant solution with hydrochloric acid, and recovering the desired elastomeric composition.

No references cited.

JOSEPH L. SCHOFER, *Primary Examiner.*

L. EDELMAN, *Assistant Examiner.*